US006310475B1

(12) United States Patent
Kawase et al.

(10) Patent No.: US 6,310,475 B1
(45) Date of Patent: Oct. 30, 2001

(54) MAGNETIC SENSOR HAVING MAGNETIC DETECTORS ARRANGED IN A DIRECTION ORTHOGONAL TO A RELATIVE MOVING DIRECTION

(75) Inventors: Masahiro Kawase, Higashimatsuyama; Koichi Hara, Saitama; Naruki Suzuki, Chichibu, all of (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 0 days.

(21) Appl. No.: 09/359,908

(22) Filed: Jul. 26, 1999

(30) Foreign Application Priority Data

Jul. 28, 1998 (JP) ................................................. 10-212140
Jul. 21, 1999 (JP) ................................................. 11-206696

(51) Int. Cl.$^7$ .......................... G01R 33/00; G01R 33/12; G01N 27/72; G07D 7/04; B07C 5/344
(52) U.S. Cl. .......................... 324/235; 324/228; 324/249; 324/260; 194/317; 194/320; 209/569
(58) Field of Search .................................. 324/206, 210, 324/228, 232, 235, 242, 243, 249, 260–262; 194/210, 213, 317–320; 235/449, 450; 209/534, 547, 567, 569

(56) References Cited

U.S. PATENT DOCUMENTS

| 4,518,919 | * | 5/1985 | Ishida | 324/235 X |
| 4,584,529 | * | 4/1986 | Aoyama | 324/261 |
| 5,457,382 | * | 10/1995 | Stein | 324/262 X |
| 5,512,822 | * | 4/1996 | Masuda | 324/235 |
| 5,889,403 | * | 3/1999 | Kawase | 324/260 X |
| 6,073,845 | * | 6/2000 | Kawase | 235/449 |

FOREIGN PATENT DOCUMENTS

| 52-69673 | * | 6/1977 | (JP) | 324/243 |
| 6-230073 | * | 10/1986 | (JP) | 324/241 |

OTHER PUBLICATIONS

Iwasaki et al; "Film Thickness And . . . Using RF Permeability Change", IEEE Transactions on Magnetics, vol. MAG–23, No. 5, pp 2506–2508, Sep. 1987.*

* cited by examiner

Primary Examiner—Gerard R. Strecker
(74) Attorney, Agent, or Firm—Fitzpatrick, Cella, Harper & Scinto

(57) ABSTRACT

A magnetic sensor for detecting magnetic fields deriving from a magnetic body to detect any magnetic body on a non-magnetic body by moving relative to the non-magnetic body in prescribed relative moving directions along the surface of the non-magnetic body includes a magnetizing magnet in which a line connecting the N and S poles thereof is a direction substantially orthogonal to, and of which one pole is arranged either in contact with or in proximity to, the surface of the non-magnetic body; and a magnetism detecting element having two magnetic detectors arranged along a magnetic field detecting direction, the magnetic field detecting direction being orthogonal to the relative moving directions in a surface parallel to the surface of the non-magnetic body, wherein the magnetic body is magnetized by the magnetizing magnet along with the movement relative to the non-magnetic body, and magnetic fields according to the quantity of the magnetized part of the magnetic body are differentially detected by the two magnetic detectors of the magnetism detecting element.

31 Claims, 15 Drawing Sheets

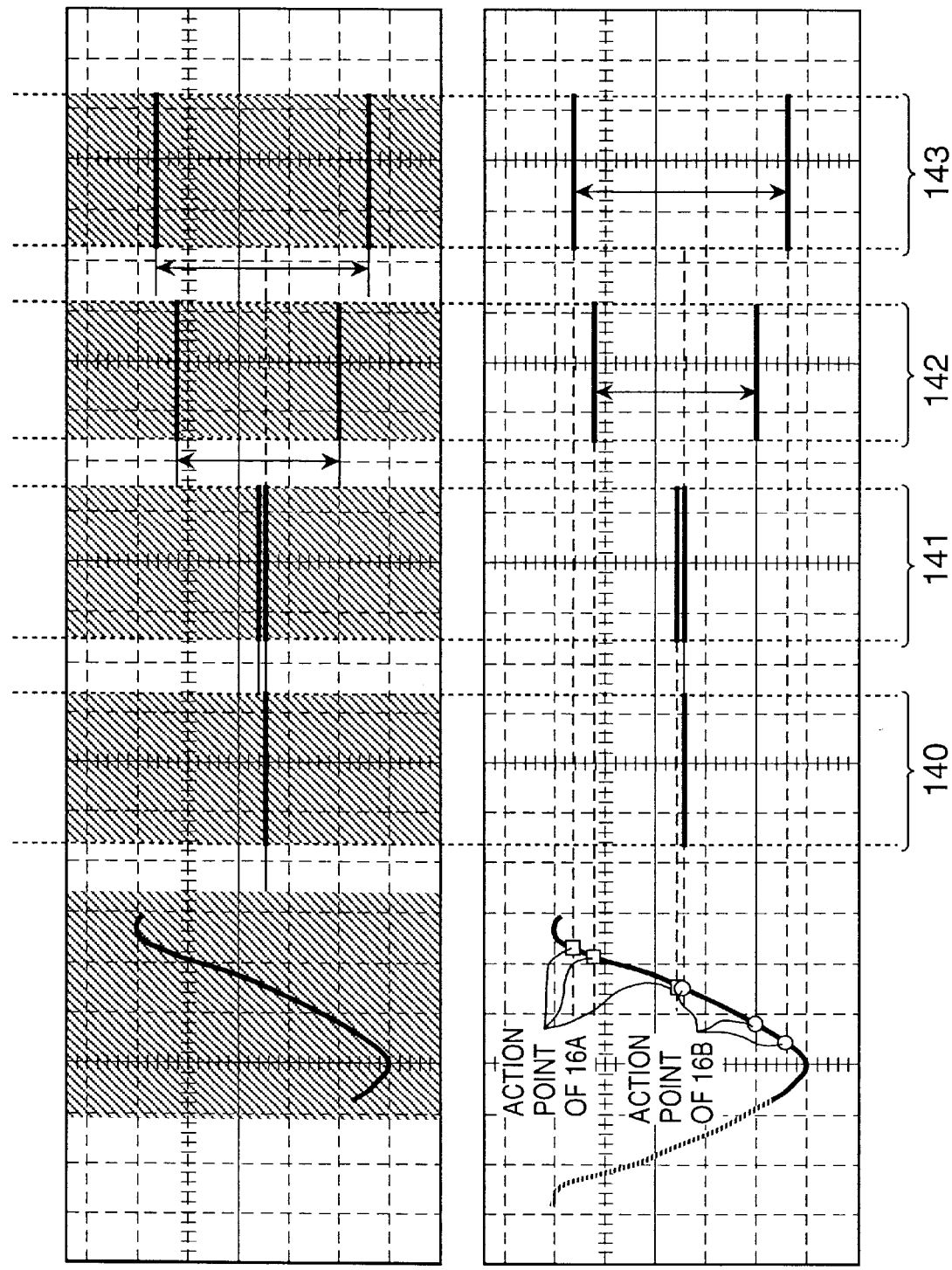

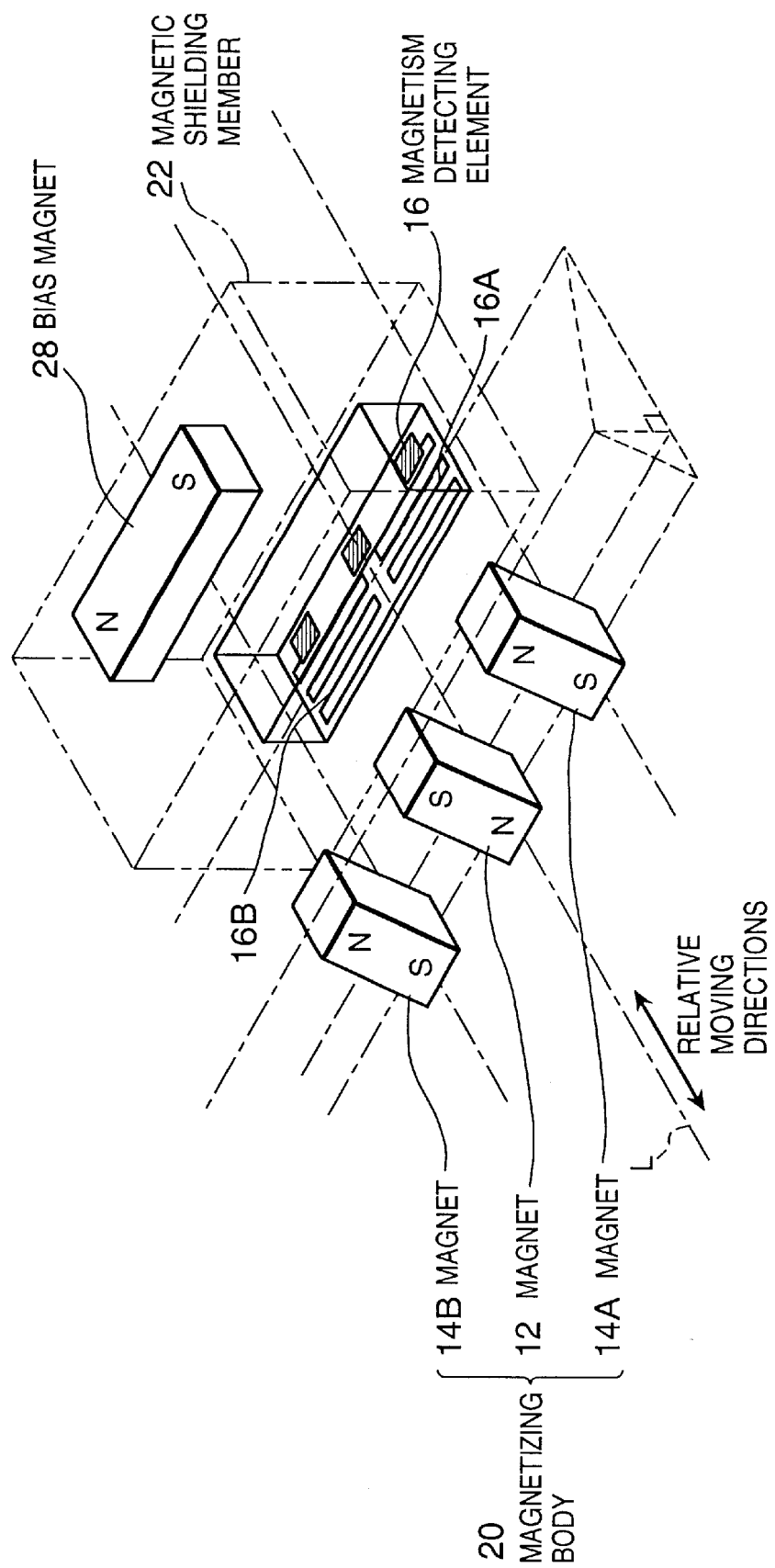

MAGNETIC SENSOR HAVING MAGNETIC DETECTORS ARRANGED IN A DIRECTION ORTHOGONAL TO A RELATIVE MOVING DIRECTION

BACKGROUND OF THE INVENTION

1. Field of the Invention

The present invention relates to a magnetic ink detecting magnetic sensor for detecting a magnetic field deriving from magnetic ink to detect magnetic ink printed on a print medium; a signal processing method for amplifying the output thereof; and a magnetic ink detecting apparatus for detecting magnetic ink with the aforementioned magnetic sensor.

2. Description of the Related Art

Conventionally, winnowing of a print medium on which magnetic ink, containing magnetic particles, is printed, such as a bank note, is mainly accomplished by detecting magnetic ink-printed portions appropriately arranged in the pattern on the print medium and discerning what the medium is on the basis of the result of the detection.

FIG. 10 illustrates an example of detection by a magnetic sensor comprising a semiconductor magnetic reluctance element. This diagram gives a cross-sectional configuration in a direction orthogonal to the moving direction, represented by an arrow, of the semiconductor magnetic reluctance element 90 relative to a print medium 93.

The semiconductor magnetic reluctance element 90 usually has two magnetic detectors 90A and 90B arranged in tandem in its moving direction relative to the print medium 93 and operated differentially. The reason for their differential operation is to compensate for the poor temperature characteristics of the elements configuring the magnetic detectors 90A and 90B by themselves, and usually neither is operated alone. To make the semiconductor magnetic reluctance element 90 sufficiently sensitive, its back face is provided with a bias magnet 92, and the direction of the line connecting its N and S poles is orthogonal to the detecting face (a surface of the medium 93).

As this semiconductor magnetic reluctance element 90 has two magnetic detectors arranged in tandem in its moving direction, its output takes on a differential waveform. A specific example is illustrated in FIG. 11. It is seen that, for instance, when the central parts of large characters "1" and "0" are scanned from left to right as shown in FIG. 11A, sensor outputs having positive peaks on the left edge negative peaks on the right edge are, i.e. a differential output waveform is, obtained as shown in FIG. 11B.

However, the above-described method of detecting edges was susceptible, as actual cases in the past demonstrated, to pass the winnowing device by sticking pieces of magnetic tape to the print medium and reproducing edge information therewith or by forging (reproducing) the medium with a copying machine using magnetic toner.

That is, magnetic sensors according to the prior art, as they can identify only differential patterns of magnetic ink, are inadequate in the accuracy of winnowing, and accordingly there is a rising need for an additional condition of winnowing.

Then, in order to attain more sophisticated winnowing, if signals are processed according to the quantity of magnetic ink, the ink can be kept track of in terms of intensity, and the accuracy of winnowing can be enhanced correspondingly.

Incidentally, if only one of the two magnetic detectors is operated, the semiconductor magnetic reluctance element can keep track of both the pattern of magnetic ink and intensity corresponding to the quantity of the ink, but the use of only one magnetic detector reveals the poorness of temperature characteristic as stated above, making it difficult to secure a steady level. There is also the problem of vulnerability to disturbing magnetic fields which deteriorate the signal-to-noise (S/N) ratio.

SUMMARY OF THE INVENTION

An object of the present invention, therefore, is to satisfy at least one of the following requirements.

(1) To provide a magnetic ink detecting magnetic sensor capable of accurately detecting magnetic fields according to the quantity of magnetic ink printed on a print medium;

(2) To provide a signal processing method allowing detection signals of the sensor, corresponding to the quantity of magnetic ink, to be amplified stably and accurately, and (3) To provide a magnetic ink detecting apparatus for detecting magnetic ink with the above-mentioned magnetic sensor, capable of stably and accurately amplifying detection signals of the sensor, corresponding to the quantity of magnetic ink and stably and accurately detecting the quantity of magnetic ink.

In order to attain the above-stated objects, as an embodiment of the invention, there is provided a magnetic sensor for detecting magnetic fields deriving from a magnetic body to detect any magnetic body on a non-magnetic body by moving relative to the non-magnetic body in prescribed relative moving directions along the surface of the non-magnetic body, comprising:

a magnetizing magnet in which a line connecting the N and S poles thereof is a direction substantially orthogonal to, and of which one pole is arranged either in contact with or in proximity to, the surface of the non-magnetic body; and a magnetism detecting element comprising two magnetic detectors arranged along a magnetic field detecting direction, the magnetic field detecting direction being orthogonal to the relative moving directions in a surface parallel to the surface of the non-magnetic body, wherein the magnetic body is magnetized by the magnetizing magnet along with the movement relative to the non-magnetic body, and magnetic fields according to the quantity of the magnetized part of the magnetic body are differentially detected by the two magnetic detectors of the magnetism detecting element.

In this case, it is preferable that an angle between a direction which is identical with a line connecting the N and S poles of the magnetizing magnet and the relative moving directions is an angle, so that the center of the magnetizing side pole and the center of the opposite side pole of the magnetizing side pole are equally distant from a straight line which passes through the center of the magnetism detecting element and is parallel to the magnetic field detecting direction, or larger than the angle and 90 degrees or less.

This can minimize the leaking magnetic field applied to the magnetism detecting element from the magnetizing magnet.

Further, when a direction identical with a line connecting the N and S poles of the magnetizing magnet meets the relative moving directions at almost 90 degrees, it is preferable that a distance between the N and S poles is ¾ or less of the distance from the center of the magnetizing side pole through the center of the magnetism detecting element to the straight line parallel to the magnetic field detecting direction.

This can reduce the leaking magnetic field applied to the magnetism detecting element from the magnetizing magnet, and because the relative moving directional component of the magnetized magnetic field along with the print medium is small, the magnetization can be effectively achieved in a direction orthogonal to the relative moving directions in a surface of the print medium, and the magnetic fields H1, H2 generated by the magnetized part of the print medium can be increased.

Further, the magnetization of the print medium is preferably achieved by the magnetizing body in which the magnetizing magnets, the NS directions of which are reverse to that of the central magnetizing magnet, are disposed at the both sides of the central magnetizing magnet.

At this time, it is preferable that the magnetizing side poles of the two magnetizing magnets disposed at the both sides of the central magnetizing magnet are positioned on the same straight line orthogonal to the relative moving directions in a surface parallel to the surface of the print medium, and are disposed at the positions being equally distant from the central magnetizing magnet, and it is more preferable that the magnetizing side poles of the central magnetizing magnet and the two magnetizing magnets disposed at the both sides of the central magnetizing magnet are all disposed on the same straight line.

Further, it is preferable that the lines connecting the N and S poles of the central magnetizing magnet and of the magnetizing magnets disposed at the both sides of the central magnetizing magnet respectively are all parallel to each other.

This can provide the symmetrical magnetization along with the both sides of the relative moving directions, and the differential detection can be effectively achieved. Further, the magnetized magnetic field, which is in a direction orthogonal to the relative moving directions and along with a surface of the medium between the central magnetizing side pole and the other magnetizing side poles disposed at the both sides of the central magnetizing side pole, increases, so that the components of the magnetic fields H1, H2 generated by the magnetized part of the print medium can be further strengthened.

In addition, it is preferable that a distance between the centers of the magnetizing side poles of the two magnetizing magnets disposed at the both sides of the central magnetizing magnet is equal to or more than a length of the magnetic field detecting direction of the magnetism detecting element.

This magnetizes a whole region detected by the magnetism detecting element to a saturated level, so that it can avoid an influence from the residual magnetization caused by the medium history, and it becomes possible to achieve a detection having a significantly good repeatability.

Further, in the configuration where three magnetizing magnets are used as the above mentioned magnetizing body, it is preferable that a distance a from the center of the magnetizing side pole of each magnetizing magnet disposed at each side of the central magnetizing magnet through the center of the magnetic field detecting element to the straight line parallel to the magnetic field detecting direction, and a distance b between the centers of magnetizing side poles of the two magnetizing magnets disposed at both sides of the central magnetizing magnet satisfy $(\sqrt{2})a > b$.

Thereby in the magnetic detector, a direction of the magnetic field generated from the magnetizing magnet to the central magnetizing magnet and a direction of the magnetic field generated by the magnetizing magnets disposed at the both sides of the central magnetizing magnet are in the directions for canceling each other, so that the leaking magnetic field applied to the magnetism detecting element from the magnetizing body can be significantly reduced to further minimize the sensor itself, and a deterioration in the characteristics of the sensor caused by such as the temperature characteristics of the magnetizing magnet can also be significantly reduced.

Further, it is preferable that an angle between a direction, which is identical with the lines connecting the N and S poles of the central magnetizing magnet and the magnetizing magnets disposed at the both sides of the central magnetizing magnet respectively, and the relative moving direction is an angle, so that the centers of the magnetizing side poles and the centers of the opposite side poles of the magnetizing side poles are equally distant from a straight line which passes through the center of the magnetism detecting element and is parallel to the magnetic field detecting direction, or is larger than the angle and is 90 degrees or less.

When the directions identical with the lines connecting the N and S poles of the three magnetizing magnets, including the central magnetizing magnet and other two magnetizing magnets disposed at the both sides of the central magnetizing magnet respectively, meet the relative moving directions at almost 90 degrees, it is preferable that the distances between the N and S poles of the three magnetizing magnets respectively are ¾ or less of the distances from the centers of the magnetizing side poles of the three magnetizing magnets respectively through the center of the magnetism detecting element to the straight line parallel to the magnetic field detecting direction.

In such a manner, in the magnetic detector an effect of canceling the magnetic field of the magnetizing side pole of the magnetizing magnet by the magnetic field of the opposite side pole of the magnetizing magnet can be effectively utilized.

Further, the magnetizing magnet and the magnetism detecting element are preferably disposed so that a direction of the line, connecting the center of the magnetizing magnet or the central magnetizing side pole and the middle point of two magnetic detectors of the magnetism detecting element, is identical with the relative moving directions.

In addition, one or more magnetizing magnet(s) is(are) preferably held by the same holder in an integral manner.

As a signal processing method for the magnetic sensor described above, there is provided a signal processing method for the magnetic sensor, as described above, for amplifying the output signals of the magnetic sensor, comprising the steps of:

obtaining a reference voltage by performing peak holding or minimum holding on unamplified output signals of the magnetic sensor in the direction reverse to the direction in which the waveform of the signals oscillates, and performing D.C. differential amplification between the unamplified output signals of the magnetic sensor and the reference voltage.

As a preferred magnetism detecting element for use in the above-described configuration, there is provided a magnetic impedance element, as used in the above-described magnetic sensor, whose impedance varies, upon application of a high frequency current, according to an external magnetic field.

As a detecting apparatus using such a magnetic sensor, there is provided a detecting apparatus comprising:

a magnetic sensor using the foregoing magnetism detecting element whose two magnetic detectors are connected in series;

an oscillating circuit for applying a high frequency current to the serial connection of the two magnetic detectors;

a detecting circuit for extracting voltage amplitude variations relative to external magnetic fields from the two ends of the ground side magnetic detector of the serial connection of the two magnetic detectors;

a voltage holding circuit for obtaining a reference voltage by performing peak holding or minimum holding on the output signals of the detecting circuit in the direction reverse to the direction in which the waveform of the signals oscillates, and a D.C. amplifier for differentially D.C.-amplifying the output signals of the detecting circuit and the reference signal.

According to another aspect of the invention, there is provided a detecting apparatus comprising:

a magnetic sensor using the foregoing magnetism detecting element whose two magnetic sensors are connected in series;

an oscillating circuit for generating a high frequency current;

two lines of circuits for separately applying the high frequency current generated by the oscillating circuit to the two magnetic detectors of the magnetism detecting element of the magnetic sensor;

two detecting circuits for extracting voltage amplitude variations relative to external magnetic fields from the two ends of each of the two magnetic detectors;

a differential amplifier for differentially amplifying the outputs of the two detecting circuits at low gains;

a voltage holding circuit for obtaining a reference voltage by performing peak holding or minimum holding on the output signals of the differential amplifier in the direction reverse to the direction in which the waveform of the signals oscillates, and a D.C. amplifier for differentially D.C.-amplifying the output signals of the differential amplifier and the reference signal.

BRIEF DESCRIPTION OF THE DRAWINGS

Other objects and features of the present invention will become apparent from the following description in this specification when taken in conjunction with the accompanying drawings, in which:

FIG. 14 is a diagram illustrating the movements of the operation points depending on the shapes of a magnetizing body; and FIG. 15 is a perspective view of a third embodiment of a magnetic ink detecting magnetic sensor.

DETAILED DESCRIPTION OF THE PREFERRED EMBODIMENT

Preferred embodiments of the present invention will be described in detail below with reference to drawings.

<Embodiment of a Magnetic Ink Detecting Magnetic Sensor>

A preferred embodiment of a magnetic ink detecting magnetic sensor will be described with reference to FIGS. 1 through 4.

Figure 1:
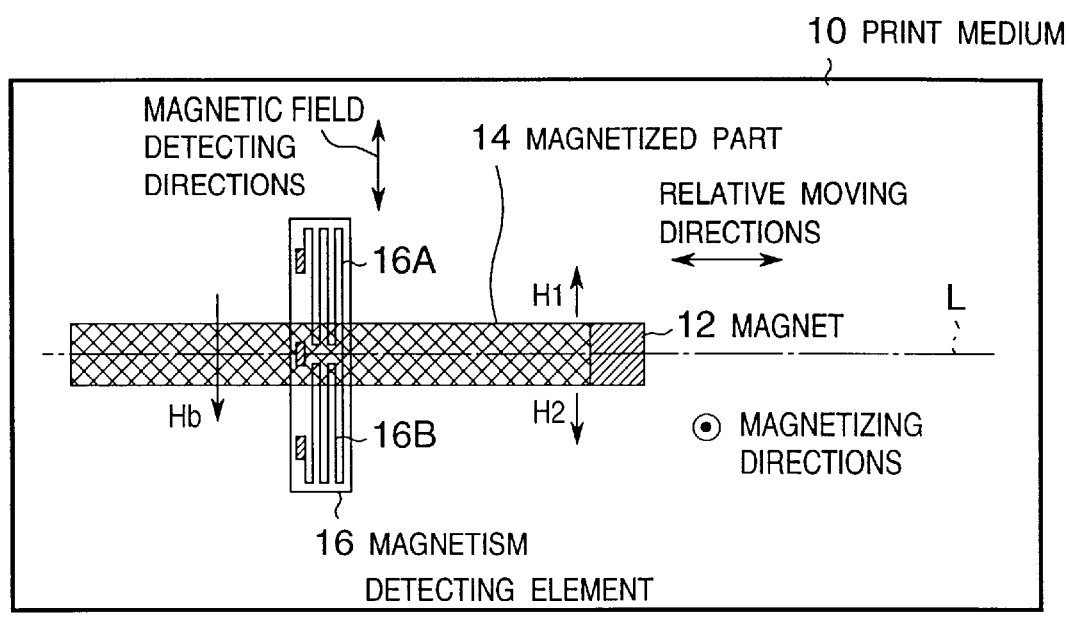
FIG. 1 is a diagram illustrating the positional relationship of a magnetizing magnet and a magnetism detecting element, provided in a magnetic sensor which is a preferred embodiment of the invention to a print medium.

First will be described the basic configuration of the magnetic ink detecting magnetic sensor with reference to FIG. 1. FIG. 1 illustrates the positional relationship of a magnetizing magnet 12 and a magnetism detecting element 16, provided in the magnetic sensor of this embodiment to a print medium (hereinafter referred as simply "medium") 10, i.e. the position relationship as viewed from above the surface of the medium 10, which is a bank note or the like, printed with magnetic ink.

In the magnetic ink detecting action, either the magnetic sensor or the medium 10 is moved in the relative moving directions (lateral directions in the diagram) indicated by the two-headed arrow, the medium 10 is magnetized in a strip shape with the magnet 12, and the magnetic field deriving from magnetic ink in its magnetized part 14 is detected with the magnetism detecting element 16.

The magnetic ink printed on the medium 10 has no predetermined quantity of magnetism, but is magnetized by applying a magnetic field to it in a direction according to the way the magnetic ink is to be detected. Since magnetized ink may be deprived of its magnetism by exposure to a strong magnetic field in the circulating process of the medium 10, for reliable operation it is essential to magnetize the magnetic ink immediately before detection.

Figure 2A:
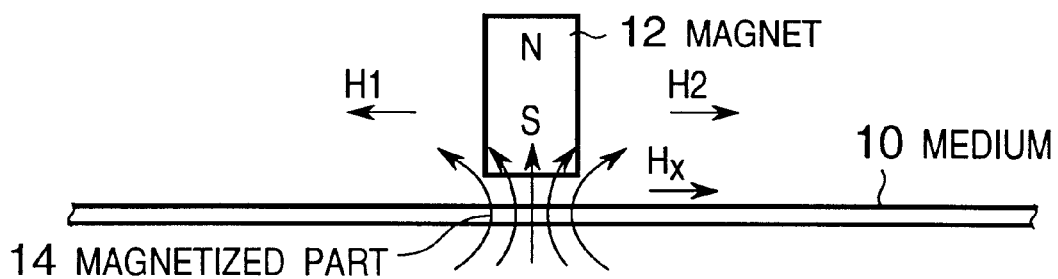
FIG. 2A is a diagram illustrating the state of the magnetic field of the magnetized portion of the print medium, magnetized by the magnetizing magnet of the magnetic sensor, and FIG. 2B, a chart illustrating the intensity of the magnetic field varying with the position of the magnetized portion.

The magnet 12 is formed in, for example, a bar shape as shown in FIG. 2A, and arranged in such a way the line connecting its N and S magnetic poles be in a direction orthogonal to the surface of the medium 10 and one of its poles (S pole in the illustration) be either close to or in contact with the surface of the medium 10. FIG. 2A shows a cross section of an area around the magnetized part 14 in a direction orthogonal to the aforementioned direction of relative movement.

The magnet 12 disposed in this manner magnetizes the magnetic ink printed on the surface of the medium 10. Whereas the magnetized part 14 of the medium 10 is obviously magnetized in a direction orthogonal to the magnetic ink detection face (surface of the medium 10), detection according to the present invention effectively utilizes magnetic field components H1 and H2, which are orthogonal to the aforementioned direction of relative movement and in parallel to the magnetic ink detection face, out of the magnetic field components generated by this magnetization.

Figure 2B:
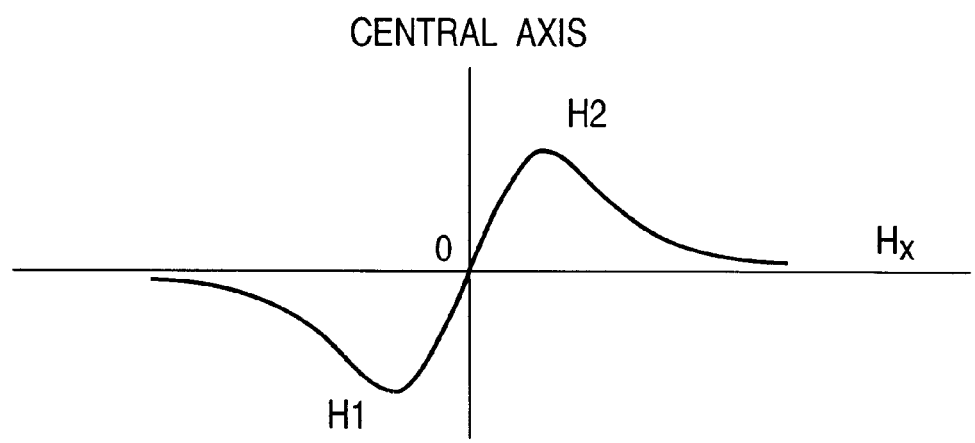

Whereas the magnetized part 14 generates magnetic fields with permanent magnetism as shown in FIG. 2A, in magnetic fields Hx of horizontal components immediately above the magnetized surface, magnetic fields whose polarities are reverse to each other are obtained on the two sides of the magnetized part 14 with respect to the central axis as shown in FIG. 2b, which, incidentally, illustrates a case in which magnetic ink is evenly printed over the surface of the medium 10.

By detecting and differentially amplifying the magnetic fields H1 and H2 reverse to each other in direction, obtained around the central axis of this magnetized part 14, disturbing magnetic fields can be canceled and the magnetic field H1+H2 is detected.

For this purpose, an element whose magnetic detectors are opposite to each other in parallel-to the detection face (surface) of the medium 10 and have highly directional magnetism detecting characteristics in a plane parallel to that detection face is used as the magnetism detecting element 16. More specifically, a magnetic impedance element whose impedances at the two ends, when a high frequency current is applied to the magnetic body configuring the core of the element, vary with respect to external magnetic fields is suitable as the magnetism detecting element 16. Especially such an element whose core magnetic body consists of films, by virtue of their patterning freedom, permits unlimited choice of the surface size of magnetic detectors, and accordingly facilitates installation of two magnetic detectors on the same non-magnetic substrate to detect the magnetic fields H1 and H2.

The magnetism detecting element 16 in FIG. 1 is a magnetic impedance element comprising magnetically highly permeable magnetic films, and has two magnetic detectors 16A and 16B each comprising a highly permeable magnetic detector formed in a zigzag line pattern. The magnetic detectors 16A and 16B are disposed in such a manner that they have the same lengthwise direction of the zigzag pattern (folding direction), which is to be the direction of magnetic field detection, be in a direction orthogonal to the aforementioned relative moving directions in a surface parallel to the surface of the medium 10, and both be along the direction of magnetic field detection mentioned above.

The magnetic detectors 16A and 16B are electrically connected in series, and both ends of each are provided with terminals (represented by hatched rectangles in FIG. 1) for extracting signals. Although the terminal between the magnetic detectors 16A and 16B is shared between them in FIG. 1, it is not necessary for them to share one terminal, and this aspect is determined by the configuration of a differential amplifying circuit to be described later. In order to equalize their performances in differential operation, it is advisable for the magnetic detectors 16A and 16B to be equalized in the pattern width of zigzag line pattern, number of folds, length and resistance among other factors.

Next will be described the magnetic field detecting operation of this magnetism detecting element 16.

Figure 3:
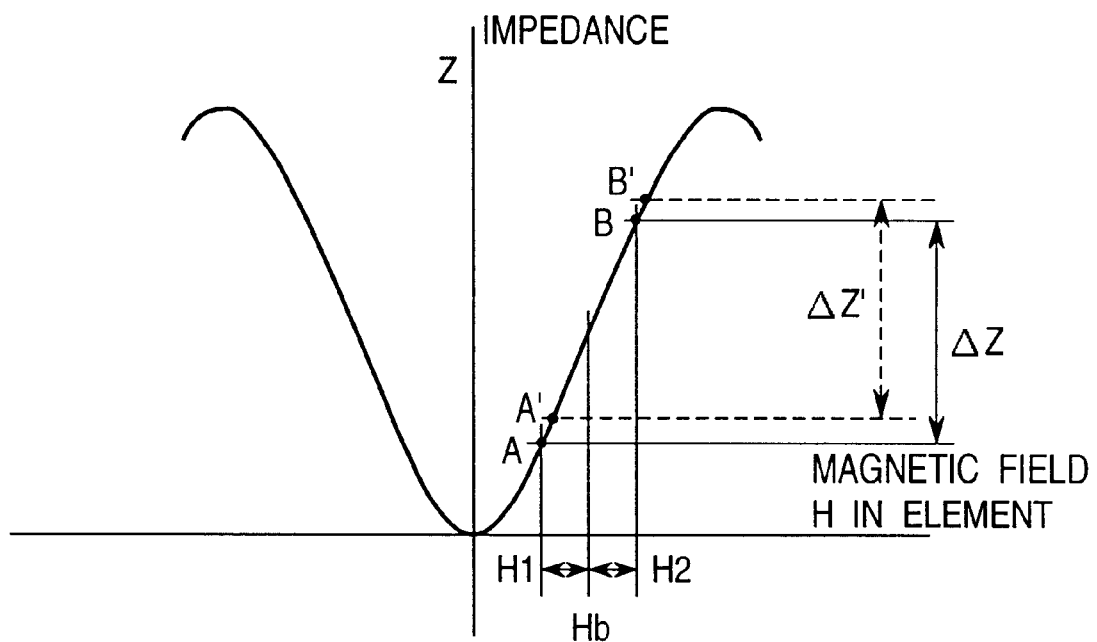
FIG. 3 is a chart illustrating the magnetic impedance characteristic of the magnetism detecting element of the magnetic sensor and the differential detection of magnetic fields H1+H2 by the setting of a bias magnetic field Hb.

The magnetism detecting element 16, i.e. the magnetic impedance element, when selecting a readily magnetizing direction in the widthwise direction of the zigzag pattern of the magnetic detectors 16A and 16B, has a V-shaped impedance varying characteristic against external magnetic fields H as shown in FIG. 3. Whereas achieving that sensitivity requires setting of a bias magnetic field, a magnetic field Hb is given by winding a coil or bringing a magnet close.

If the magnetic fields H1 and H2 to be detected are in respectively reverse to and the same as the bias magnetic field Hb in direction, the action points in magnetic field detection will deviate from each other between A and B, and an impedance different ΔZ, indicated by a two-headed arrow, can be extracted by differential operation as an output. Even if the action points A and B are shifted by disturbing magnetic fields to A' and B', the impedance difference ΔZ' will remain substantially equal to ΔZ.

That is, performing differential detection with the magnetic detectors 16A and 16B in a state where the bias magnetic field Hb is applied, disturbing magnetic fields can be canceled, and the magnetic field H1+H2 according to the quantity of magnetic ink in the magnetized part 14 can be detected accurately.

Next will be described the specific configuration of the magnetic sensor, which is the currently discussed embodiment of the invention.

In a specific configuration of a magnetic sensor, integrated holding of the magnetizing magnet 12 and the magnetism detecting element 16 by the same holder facilitates handling. Such a configuration will be described here.

An important point deserving attention in their integrated holding is not to let any magnetic field from the magnetizing magnet 12 adversely affect the operation of the magnetism detecting element 16. While the magnet 12 requires a magnetic flux density of about 1 kilogauss to sufficiently magnetize the magnetic ink, the bias magnetic field Hb of the magnetism detecting element 16 has only a few milligausses, and treating magnetic fields so widely differing in density in close proximity to each other indispensably requires an appropriate step against interference.

Figure 4:
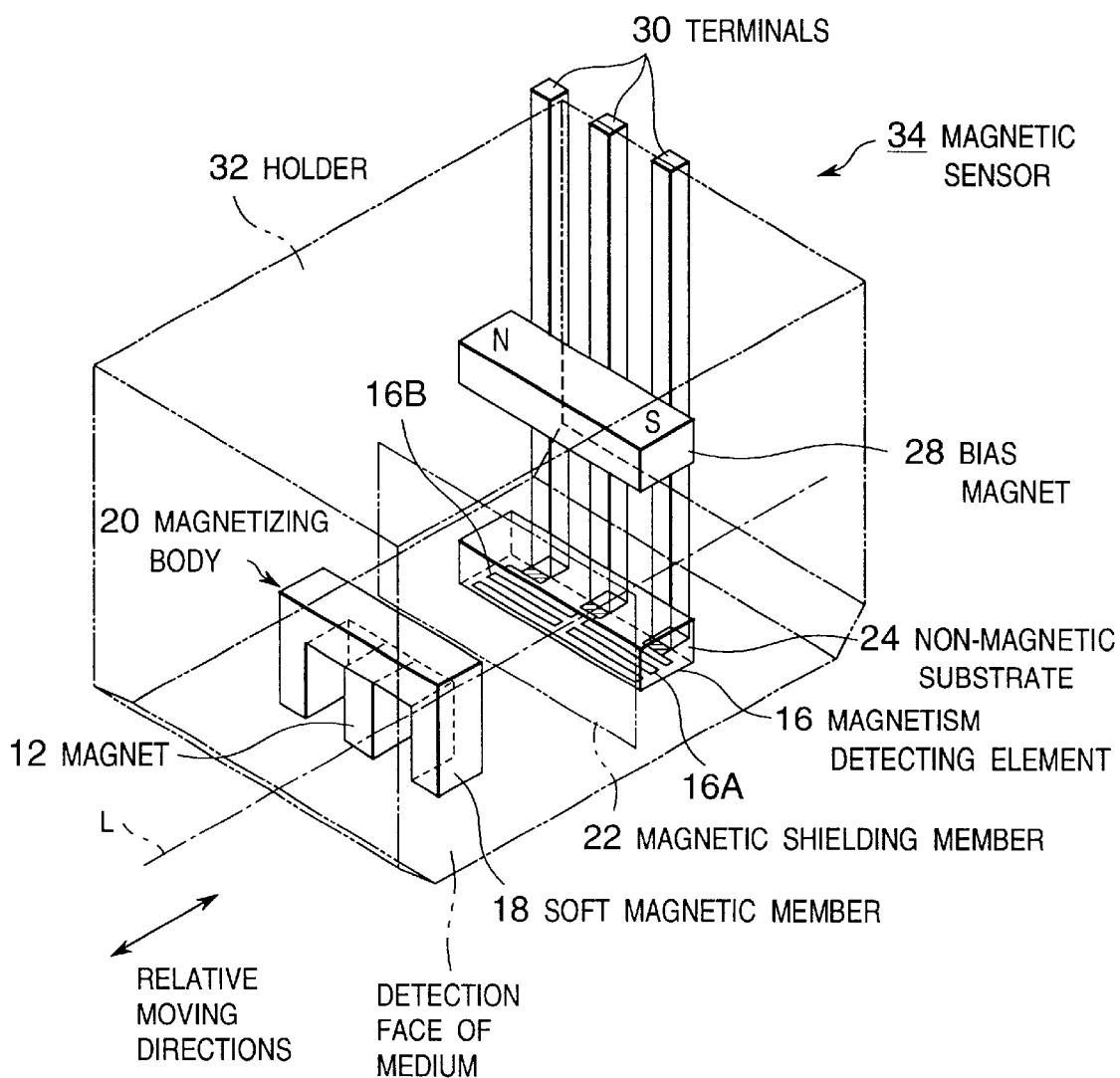
FIG. 4 gives a perspective view of a specific configuration of the magnetic sensor.

FIG. 4 illustrates a configuration of a magnetic sensor 34 in which the magnet 12 and the magnetism detecting element 16 are held in an integrated manner by the same holder 32.

In this configuration of the magnetic sensor 34, a U-shaped soft magnetic member 18 of permalloy, ferrite or the like is positioned across and over the bar-shaped magnet 12 to constitute a substantially E-shaped magnetizing body 20 with the magnet 12 within the U-shaped member 18, and the magnetizing body 20 is so arranged that the three open ends of the aforementioned E shape come either into contact with or close to the surface of the medium 10 and be in a direction orthogonal to the relative moving directions mentioned above.

This configuration of the magnetizing body 20 can minimize magnetic field components directed to the magnetism detecting element 16 by concentrating the magnetic flux from the magnet 12 in directions along the faces configuring the aforementioned E shape, and an effect to strengthen the magnetic fields H1 and H2 deriving from the magnetized part 14, after it has been magnetized, by increasing the magnetic field component along the magnetic ink detection face (surface) of the medium 10 through the magnetization of the medium 10.

If it is required to further reduce the spread of magnetic fields from the magnet 12 to the magnetism detecting element 16, a partitioning-shaped magnetic shielding member 22 of permalloy, amorphous material or the like may be disposed between the magnetizing body 20 and the magnetism detecting element 16 as illustrated. The magnetic shielding member may as well be cylindrically shaped and surround the magnetism detecting element 16. In this case, it can also be expected to serve as a noise shield against disturbances.

The magnetism detecting element 16 includes a nonmagnetic substrate 24 of glass, ceramic or the like and, formed over it, the aforementioned two zigzag line-patterned magnetic detectors 16A and 16B made of highly permeable magnetic films of amorphous material, permalloy or the like, and the length of the zigzag parts of the zigzag line-patterned magnetic detectors 16A and 16B is selected according to the required detection width, with their number of folds and width selected according to resolution. The zigzag parts of the magnetic detectors 16A and 16B are held in parallel with the detection face of the medium 10 with a space in the order of a few tenths of a millimeter. Further, as stated above, the magnetic detectors 16A and 16B are disposed in such a manner that they have the same lengthwise direction of the zigzag pattern (folding direction), which is to be the direction of magnetic field detection, be in a direction orthogonal to the aforementioned relative moving directions in a surface parallel to the surface of the medium 10, and both be along the direction of magnetic field detection mentioned above.

Above and close to the magnetism detecting element 16 is installed a bias magnet 28, which generates the aforementioned bias magnetic field Hb and sets the magnetism detecting element 16 in a highly sensitive action point. A coil may be wound round the magnetism detecting element 16 and a current let flow through it to apply a bias magnetic field.

The magnet 12 and the magnetism detecting element 16 are so arranged that the direction of a straight line L connecting the center of the magnetizing side pole of the magnet 12 and the middle point between the magnetic detectors 16A and 16B of the magnetism detecting element 16 be identical with the relative moving directions of the magnetic sensor and the medium. By this arrangement, the sensitivities of the magnetic detectors 16A and 16B to the magnetic fields of the magnetized part 14 can be substantially equalized.

Detection signals of the magnetic detectors 16A and 16B are extracted at the side away from the detection face through terminals 30 connected to the magnetic detectors 16A and 16B.

When detecting magnetic ink with this configuration, the magnetic sensor 34 is moved relative to the medium 10 in the relative moving directions indicated by the two-headed arrow, the magnet 12 of the magnetizing body 20 magnetizes the medium 10 along with the movement, and the aforementioned magnetic field H1+H2 is differentially detected by the magnetic detectors 16A and 16B of the magnetism detecting element 16 according to the quantity of magnetic ink in the magnetized part. Thus, a high frequency current is applied to the serial connection of the magnetic detectors 16A and 16B as will be described below, the impedances at the two ends of each of the magnetic detectors 16A and 16B vary according to disturbing magnetic fields including the aforementioned magnetic field H1+H2, and voltage amplitude variations relative to external magnetic fields are extracted from the grounded end of each of the two magnetic detectors as detection signals. It is possible here to cancel the disturbing magnetic fields by differential detection, and accurately detect magnetic fields according to the quantity of magnetic ink printed on the medium 10.

<Embodiment 2 of a Magnetic Ink Detecting Magnetic Sensor>

Figure 12:
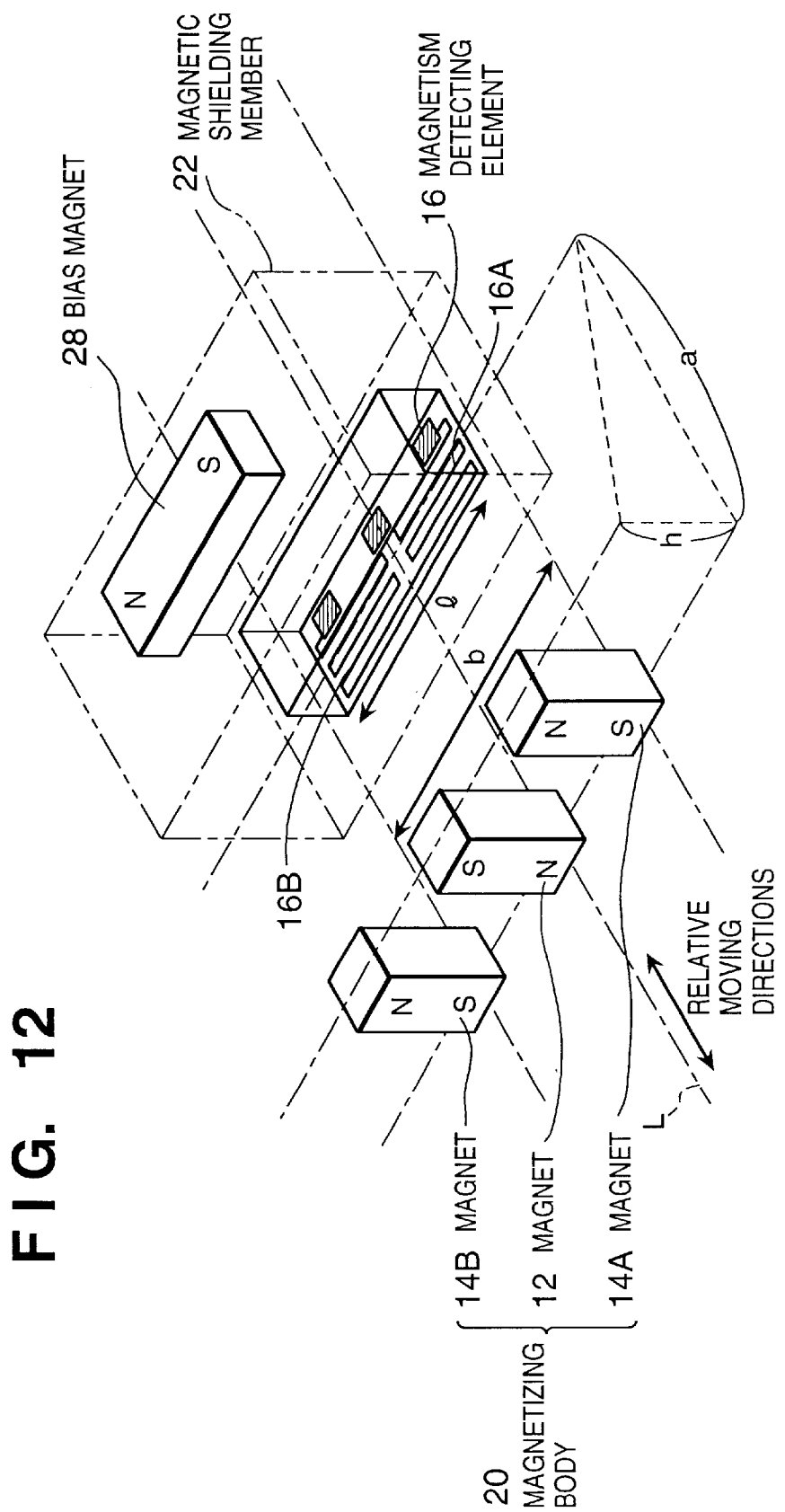
FIG. 12 is a perspective view of a second embodiment of a magnetic ink detecting magnetic sensor.

FIG. 12 illustrates a second embodiment of a magnetic ink detecting magnetic sensor according to the present invention, in which a positional relationship of a magnetizing body 20 and a magnetism detecting element 16 and a bias magnet 28 all of which are disposed within a same holder is illustrated. A configuration of this embodiment is the same as that of FIG. 4, except for the configuration of the magnetizing body 20, and the operational principle is also the same as that of above mentioned embodiment. In addition, in this embodiment, a magnetic shielding member 22 is in the form of surrounding the magnetism detecting element for enhancing its shielding effect.

The magnetizing body 20 includes a central magnetizing magnet 12 at both side of which the magnetizing magnets 14A, 14B are disposed, in which one of the magnetic poles of each magnet is contacted with or proximity to the medium 10 to be magnetized, and the directions identical with the lines connecting the N and S poles of these three magnetizing magnets respectively are substantially orthogonal to a surface of the medium 10, and a magnetized direction of the central magnetizing magnet 12 is reverse to that of the magnetizing magnets 14A, 14B disposed at the both sides of the central magnetizing magnet 12. Centers of magnetizing side poles of the three magnetizing magnets 12, 14A, and 14B are arranged at same intervals on a straight line orthogonal to the relative moving directions in a surface parallel to a surface of the medium 10. In addition, a straight line L connecting the center of magnetizing side pole of the central magnetizing magnet 12 and the middle point between the magnetic detectors 16A, 16B of the magnetism detecting element is parallel to the relative moving directions of the magnetic sensor and the medium.

Magnetization of the medium by the magnetizing body 20 of FIG. 12 is achieved by the magnetic poles, having different polarities which are contacted with or in proximity to the medium to be magnetized, and the magnetized magnetic field along the medium surface generated between their magnetic poles is larger than the magnetizing body illustrated in FIG. 4 of the above mentioned embodiment, so that the magnetic fields H1, H2 for the magnetism detecting element caused by the magnetized part of the medium can be further strengthened.

In FIG. 12, the magnetizing magnets 14A, 14B disposed at both sides of the magnetizing body 20 are arranged so that a distance b between the magnetizing side poles and a length l of the magnetism detecting element 16 satisfy b>l. This can magnetize the whole width detected by the magnetism detecting element 16 without being affected by the residual magnetization caused by the medium history, so that it is possible to achieve a detection having good repeatability.

Figure 13A:
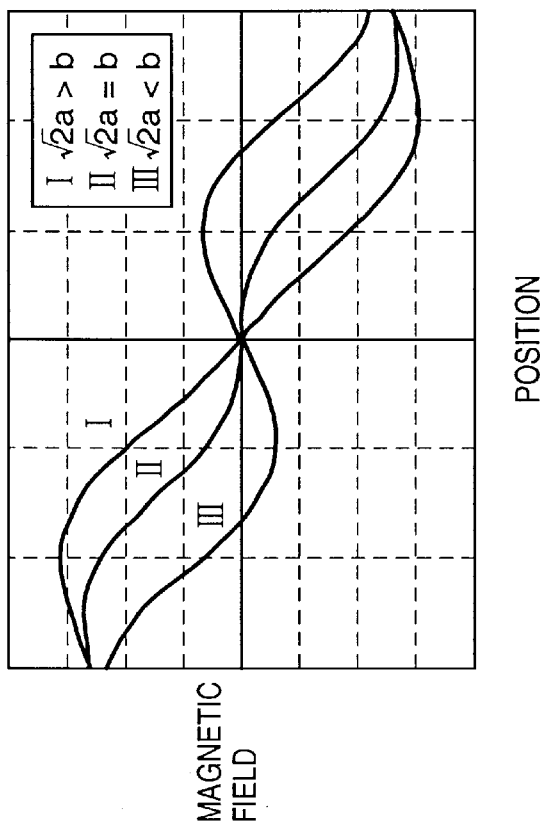
FIG. 13A is a graph illustrating a magnetic field of a central magnetizing magnet which influences a magnetism detecting element and FIG. 13B is a graph illustrating the magnetic fields of the magnetizing magnets disposed at both sides of the central magnetizing magnet which influence the magnetism detecting element, both are according to the second embodiment of a magnetic ink detecting magnetic sensor.
Figure 13B:
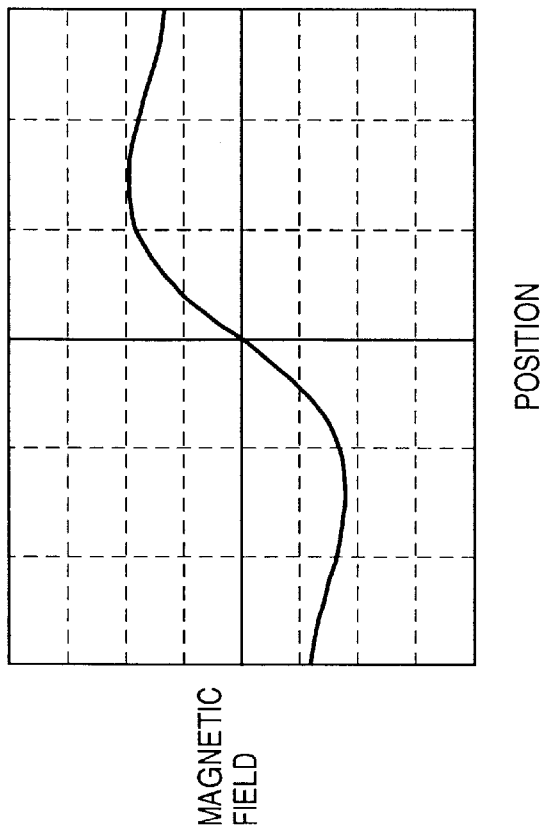

Further, in FIG. 12, the magnetizing magnets 14A, 14B are disposed so that distances a and b from their magnetizing side poles to the magnetism detecting element 16 the distance b may satisfy $(\sqrt{2})a>b$. A leaking magnetic field applied in a converse direction from the magnetizing body 20 to the two magnetic detectors 16A, 16B causes a disturbance during the detection, and particularly where a distance between the magnetizing body and the magnetism detecting element becomes smaller due to the miniaturization of the sensor, the leaking magnetic field becomes greatly larger. The elimination of this disturbance is very important when a highly accurate detection is to be carried out by using a magnetic impedance element having a narrow operating magnetic range as a magnetism detecting element, and therefore some means of eliminating the disturbance is required. FIG. 13A illustrates the magnitude of the magnetic field applied to the magnetic field detecting direction of the magnetism detecting element 16 from the central magnetizing magnet 12, and FIG. 13B illustrates that from the two magnetizing magnets 14A, 14B disposed at the both sides of the central magnetizing magnet 12. A center of the magnetism detecting element 16 is supposed to be an origin, and the magnetic field variations depending on the positions on a straight line passing through the two magnetic detectors 16A, 16B are illustrated. The magnetic fields from the magnetizing magnets 14A, 14B vary with a relationship between the distances a and b, and these magnetic fields become the shapes for canceling the magnetic field from the central magnetizing magnet 12, when $(\sqrt{2})a>b$. The leaking magnetic field applied to the magnetism detecting element slightly varies due to the shape of the shield or the like, so that it is possible to minimize the magnetic field applied to the magnetism detecting element by changing the values of b or a under the condition of $(\sqrt{2})a>b$.

The condition $(\sqrt{2})a>b$ here is not only applied to the magnetizing body of FIG. 12, but also effective in the case that the central magnetizing side pole and the magnetizing side poles disposed at the both sides of the central magnetizing side pole are not aligned on the same line and in the case that the magnetizing magnets disposed at the both sides of the central magnetizing magnet are, for example, inclined so that they widen toward their lower ends. This condition is also effective in the case that the magnetizing body is not held in an integral manner.

In addition, the magnetizing magnets 12, 14A, and 14B in FIG. 12 are disposed so that the each distance h between the N and S poles thereof satisfies $h \leq (\frac{3}{4})a$. In a configuration of the magnetizing body 20 of this embodiment, the magnetic field of a magnetic pole which is an opposite side of the magnetizing side pole of the magnetizing magnet can effect the cancellation of the magnetic field of the magnetizing side pole. For this reason, the distances between the N and S poles of the magnetizing magnets are better to be as short as possible within a range in which the required magnetized magnetic field can be obtained. Because the magnetic field applied from the magnetic pole of the magnetizing magnet to the magnetic field detecting direction of the magnetism detecting element is inversely proportional to the third power of the distance between the magnetic pole and the magnetism detecting element, when the distances h and a are $a^3/(\sqrt{a^2+h^2})^3 < \frac{1}{2}$, that is, when they are approximately $h \leq (\frac{3}{4})a$, the magnetic field from the magnetizing side pole can be reduced by half or lower to effectively use the cancellation effect obtained by the opposite side magnetic pole.

The condition $h \leq (\frac{3}{4})a$ here is also not only applied to the magnetizing body of FIG. 12, but also effective in the case that the central magnetizing side pole and the magnetizing side poles disposed at the both sides of the central magnetizing side pole are not aligned on the same line and in the case that the magnetizing body is not held integrally. In addition, this condition is also effective in the case that only a single magnetizing magnet which is a basic configuration of the present invention is disposed.

FIG. 14 shows a result of actually measuring the variations of the magnetic field applied to the magnetism detecting element, depending on the shape of the magnetizing body. The V-shaped curved line at the left end shows an output of the used magnetic impedance element for the magnetic field, wherein a numeral 140 illustrates the output levels of two elements in the case that only a magnetic field of the biased magnet is applied in the state without any magnetizing body. In this case, because the same biased magnetic field is applied to the two elements, the two output levels are overlapped. When the leaking magnetic fields being in opposite directions are applied to the two elements by installing the magnetizing body, the operation points of the two elements move in the opposite directions, and the difference appears between both output levels. Because this difference between the output levels varies in accordance with the temperature characteristics of the magnetizing magnets, the deterioration of the characteristics can not be avoided even if the biased magnetic fields of the two elements are adjusted to meet their output levels. In addition, when the gap between the operation points becomes larger, the adjustment itself becomes difficult. In FIG. 14, numerals 141 to 143 illustrate the output levels when three kinds of magnetizing bodies are provided. The numeral 141 is in the case that the magnetizing body configured by the three magnets according to the present invention is used, and the dispositions of the magnetizing magnets satisfy the above mentioned condition. The numeral 142 is in the case that the magnet and the U-shaped core of FIG. 4 in the above mentioned embodiment are combined, and the numeral 143 is in the case that a single magnetizing magnet which is a basic configuration of the present invention is used. As illustrated in FIG. 12, using a configuration of the magnetized part of this embodiment can minimize an influence to the magnetism detecting element, so that the miniaturization can be compatible with the highly accurate detection by using the magnetic impedance element.

<Embodiment 3 of a Magnetic Ink Detecting Magnetic Sensor>

FIG. 15 illustrates a third embodiment of a magnetic ink detecting magnetic sensor according to the present invention. The NS directions of the central magnet 13 and the magnets 14A, 14B disposed at the both sides of the central magnet 13 are oppositely parallel to each other, and the centers of magnetizing side poles of the three magnets are arranged at the same intervals on a straight line orthogonal to the relative moving directions on a surface parallel to the surface of the medium to be magnetized. The NS directions of the three magnetizing magnets are inclined from a direction orthogonal to the surface of the medium to be magnetized, and the tilt angle is within a range in which the distances, from a direction orthogonal to the surface of the medium to the magnetic poles of the magnetizing magnets disposed at the both sides of the central magnetizing magnet and the magnetic detector, become equal.

In this embodiment, the effect of canceling the magnetic field applied from magnetizing side poles to the magnetic detector is enormous, because the distance between the magnetic pole in opposite side of the magnetizing side pole and the magnetic detector becomes shorter as compared with the case in which the NS direction of the magnetizing magnet is orthogonal to the surface of the medium to be magnetized. By equalizing the distances from the magnetic poles disposed at both sides of the central magnetizing magnet to the magnetic detector, the influence of the magnetic field from the magnetized part is almost nothing. This is very effective for the case in which it is necessary to minimize to the utmost the output level difference caused by the gap between the operation points in order to differentially amplify the two elements outputs by the very large gain, and for the case in which the above mentioned conditions for the arrangements can not be satisfied due to such as the size of a holder and the limitation of detecting width.

The method of enhancing the cancellation effect of the magnetic field by inclining the NS direction of the magnetizing magnets according to this embodiment is of course effective for using a single magnetizing magnet which is a basic configuration of the present invention.

<Embodiment of a Magnetic Ink Detecting Apparatus>

Next will be described with reference to FIGS. 5 to 8 another embodiment of the present invention, which is a magnetic ink detecting apparatus for detecting magnetic ink with the magnetic sensor 34 described above.

The aforementioned magnetic field detection signals by the magnetic sensor 34 according to the quantity of magnetic ink are converted by differential operation into asymmetrical signals whose output waveform oscillates only in the positive or negative direction with respect to the base line of a reference potential (zero potential), and their amplification is basically D.C. amplification. However, as simple D.C. amplification is susceptible to the fluctuation of the base line of the output by impedance variations due to the temperature characteristic of the magnetism detecting element 16 itself or gradual variations of disturbing magnetic fields, determination of the quantity of magnetic ink with the D.C. voltage of amplified detection signals is impeded. In view of this problem, the circuit configuration of a magnetic ink detecting apparatus with a built-in means to avert the influence of this impediment is illustrated in FIG. 5.

Figure 5:
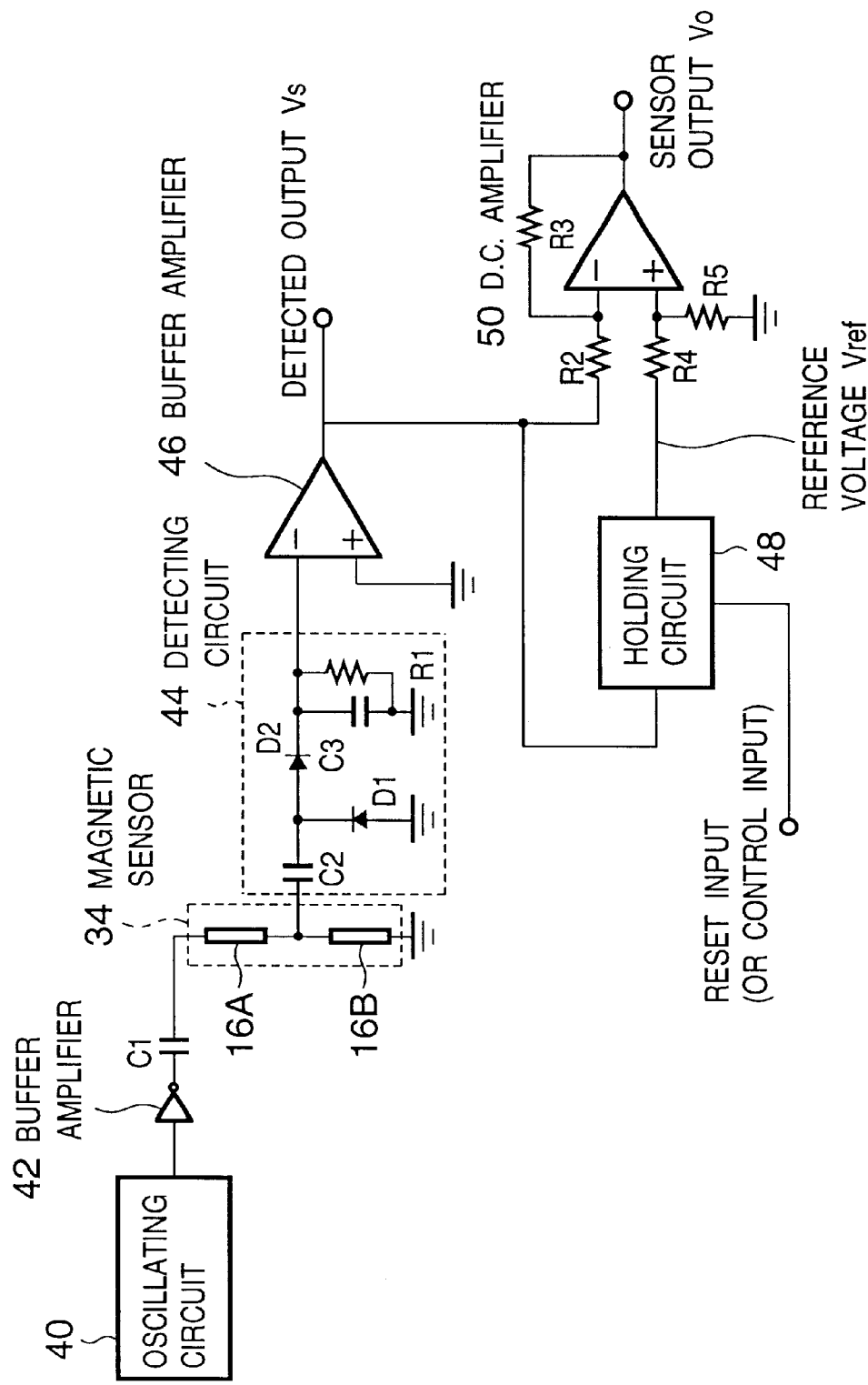
FIG. 5 is a circuit diagram illustrating the circuit configuration of a magnetic ink detecting apparatus using the magnetic sensor in a mode of carrying out the invention.

The magnetic ink detecting apparatus illustrated in FIG. 5 comprises the magnetic sensor 34, an oscillating circuit 40, a buffer amplifier 42, a detecting circuit 44, a buffer amplifier 46, a holding circuit (voltage holding circuit) 48, and a D.C. amplifier 50.

The oscillating circuit 40 is a high frequency oscillating circuit for generating a high frequency current to enable the magnetism detecting element 16 of the magnetic sensor 34 to exert a magnetic impedance effect, and uses an oscillating frequency in the MHz band. After removing the D.C. component with a capacitor C1 via the buffer amplifier 42, a high frequency current is applied from that oscillating circuit 40 to the serial connection of the magnetic detectors 16A and 16B of the magnetic sensor 34. Which of the magnetic detectors 16A and 16B is to be on the ground side can be determined according to the polarity of the sensor output. Here, amplitude variations against disturbing magnetic fields are extracted as signals from the two ends of the magnetic detector 16B, which in this case is on the ground side of the serial connection of magnetic detectors 16A and 16B, through detection by the detecting circuit 44, and a detected output Vs is obtained via the buffer amplifier 46.

After that, the problem is how to D.C.-amplify this detected output voltage Vs. Note should be taken that the waveform of the detected output Vs, before amplification occurs, is oscillating onto only the plus or minus side with respect to the base line. In other words, the oscillating direction is in only the negative direction or the positive direction with respect to the base line. In the holding circuit 48, the peak holding or the minimum holding of the detected output Vs is performed in the direction opposite to the direction in which the signal waveform oscillates relative to the base line. And, the detected output Vs and a reference voltage Vref are subjected to D.C. differential amplification by a D.C. amplifier 50 by using the holding voltage as the reference voltage Vref, to obtain a sensor output Vo, that is, a magnetic ink detecting signal.

Figure 6:
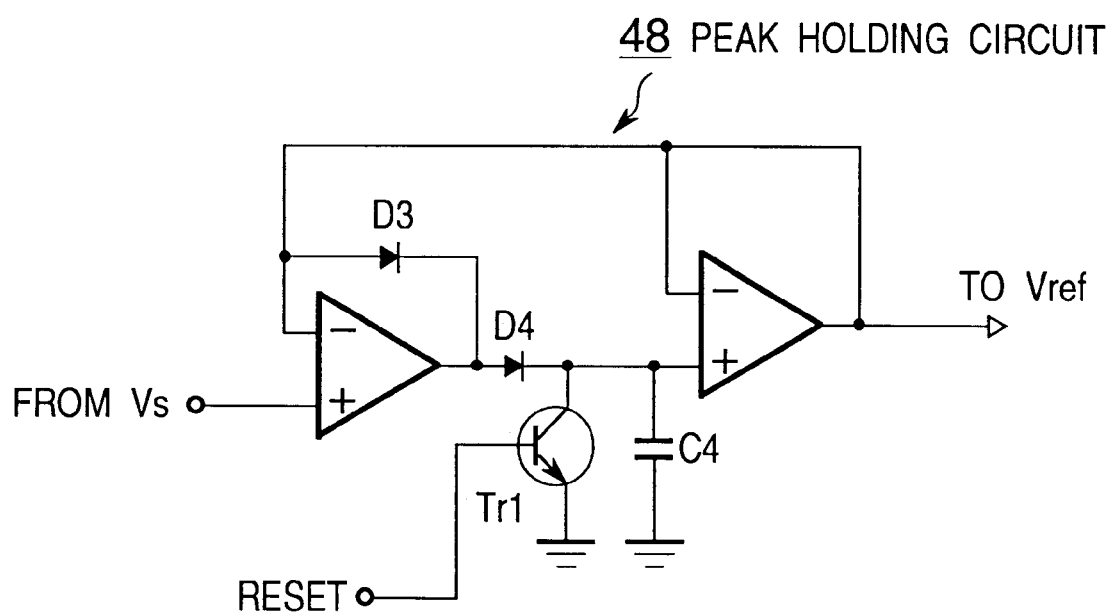
FIG. 6 is a circuit diagram of a peak holding circuit that can be used as the holding circuit in FIG. 5.

As the holding circuit 48 may be chosen, for example, a peak holding circuit such as shown in FIG. 6, where the detected output Vs is a signal oscillating to the minus side. If the detected output oscillates to the plus side, it may be a minimum holding circuit in which diodes D3 and D4 are in mutually reverse directions. Incidentally, the RESET input of the holding circuit 48 is used for resetting in the event of an erroneous action caused by noise that has been picked up, or for sample holding so that only those areas where the absence of magnetic ink is certain can be held without fail.

The peak holding or minimum holding circuit can be substituted for with processing by a microcomputer including analog-to-digital (A/D) and digital-to-analog (D/A) conversions, and more intelligent processing could as well be accomplished in synergy with a determination control section.

Next will be described, with reference to FIG. 7, an action that can stabilize the base line of the sensor output with the above-described configuration.

Figure 7:
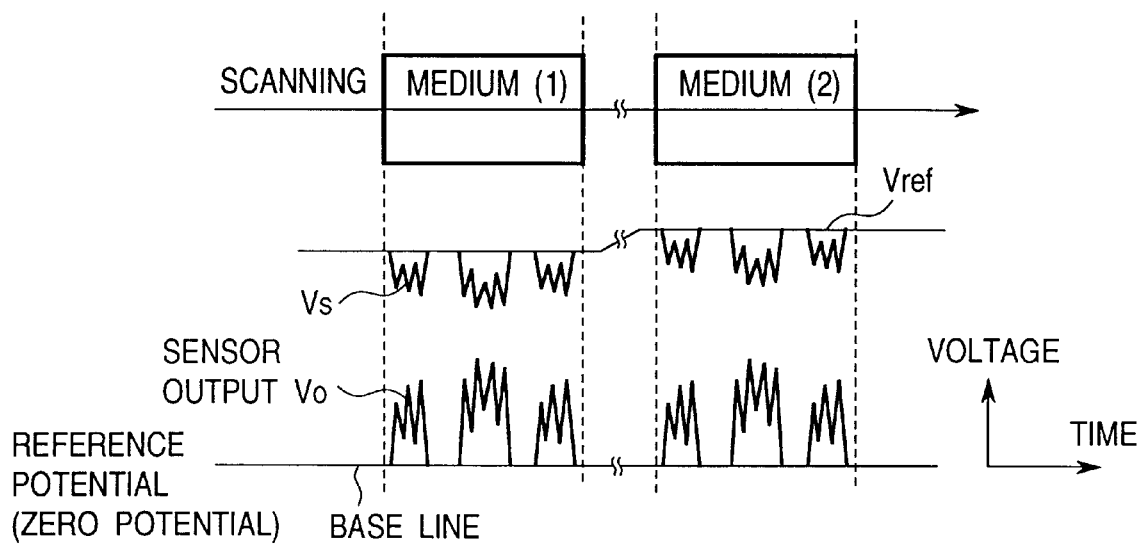
FIG. 7 is a timing chart of the post-detection output Vs, reference voltage Vref and sensor output Vo in a case wherein a print medium is scanned by the magnetic ink detecting apparatus in this mode of carrying out the invention.

When media (1) and (2) shown in FIG. 7 are scanned by moving the aforesaid magnetic ink detecting apparatus relative to the media in the relative moving direction indicated by an arrow, and the detected output Vs and a reference voltage Vref obtained from the aforementioned held voltage are subjected to D.C. differential amplification by the D.C. amplifier 50, a sensor output Vo is obtained, whose base line coincides with a zero potential, which is the reference voltage. It is seen that, even if a temperature characteristic or the like causes the detected output Vs to shift in level during the interval from the medium (1) to medium (2), the reference voltage Vref can keep track of it to assess a stable D.C. voltage level free from fluctuations of the base line of the sensor output Vo.

Further, a gradual drop in the level of the unamplified sensor output Vs can be addressed either by using the RESET input to reset the holding circuit 48 as required or giving a capacitor C4, as its discharge characteristic, a sufficiently gradual hold attenuation characteristic against one round of scanning of the media.

Thus, the magnetic ink detecting apparatus, which is the embodiment of the invention under discussion, can stabilize the base line of the sensor output and provide a sensor output whose voltage level accurately matches the quantity of magnetic ink. Thus it can stably and accurately detect the quantity of magnetic ink.

And by A/D converting the output Vo of the D.C. amplifier 50, which is a stable output accurately matching the quantity of magnetic ink, and performing pattern recognition and determining the level of the quantity of magnetic ink in a way suitable for the individual medium with a microcomputer or the like, winnowing of bank notes and other print medium can be accomplished a level higher in identifying accuracy than by any conventional technique. An effective means can be thereby provided against illegal acts such as forgery of print media including bank notes.

<Another Embodiment of a Magnetic Ink Detecting Apparatus>

Next will be described, with reference to FIG. 8, the circuit configuration of a magnetic ink detecting apparatus, which is another embodiment of the present invention.

In the circuit configuration of the earlier described magnetic ink detecting apparatus of FIG. 5, the magnetic detectors 16A and 16B of the magnetism detecting element 16 of the magnetic sensor 34 are connected in series, and a high frequency current is applied commonly to the two detectors.

Figure 8:
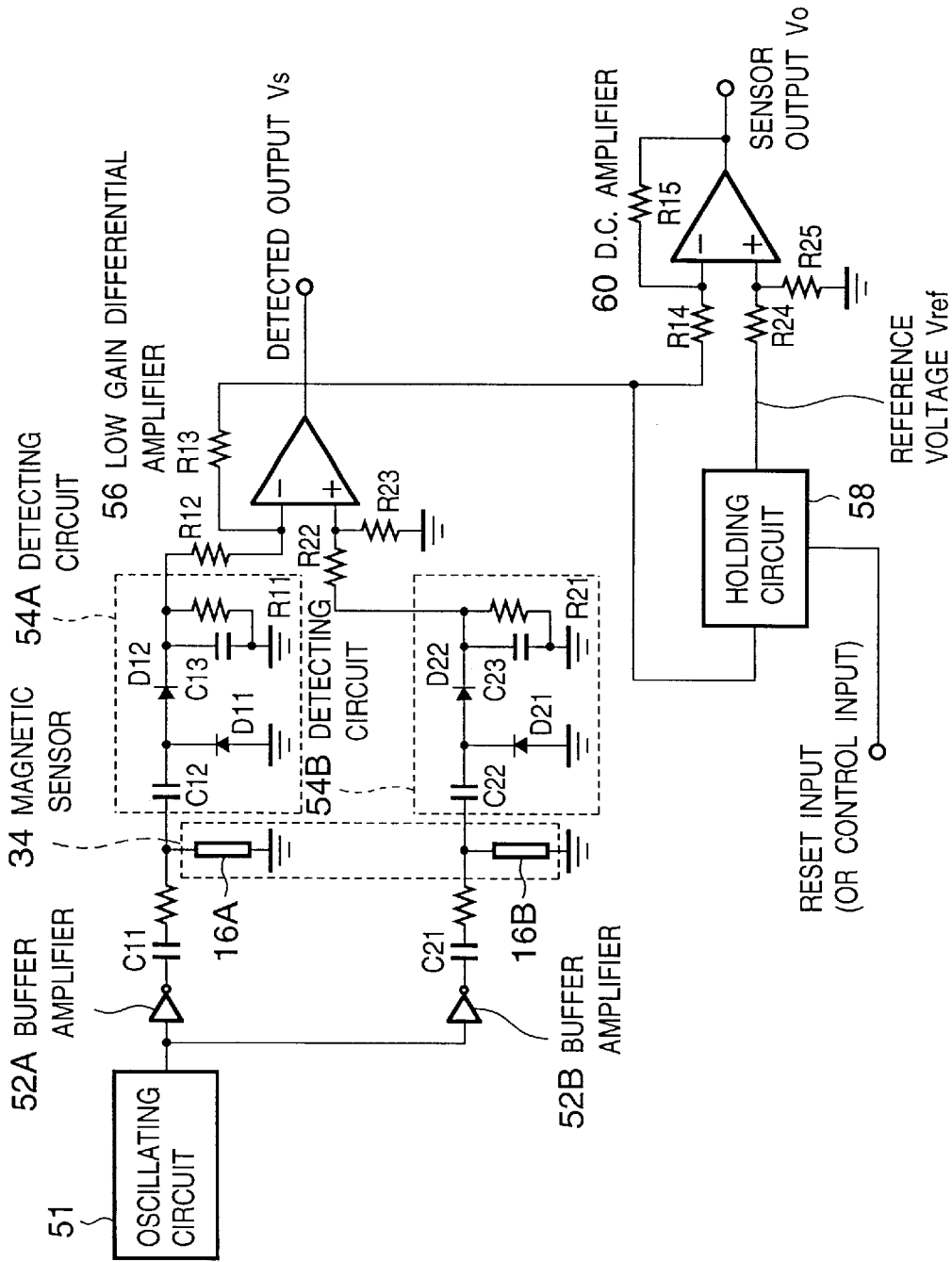
FIG. 8 is a circuit diagram illustrating the circuit configuration of a magnetic ink detecting apparatus in another mode of carrying out the invention.

In contrast to the foregoing, according to the circuit configuration of FIG. 8, two lines of circuits to apply high frequency current from the oscillating circuit 51 are provided, comprising buffer amplifiers 52A and 52B and capacitors C11 and C21, respectively, and the high frequency currents are separately applied to magnetic detectors 16A and 16B. Amplitude variations of voltages against external magnetic fields are extracted as signals by detecting circuits 54A and 54B from both ends of each of the magnetic detectors 16A and 16B, and these two signals are differentially amplified by a D.C. differential amplifier 56 of a low gain, from 100% to a few hundred percent, to obtain a detected output vs. Then the detected output Vs is peak-held or minimum-held by a holding circuit 58 in the direction reverse to that in which the signal waveform oscillates as previously described to obtain a reference voltage Vref . Then the detected output Vs and the reference voltage Vref are subjected to D.C. differential amplification by a D.C. amplifier 60 to obtain a sensor output Vo.

This configuration illustrated in FIG. 8, although it involves a greater number of components, is effective when differential operation is desired to be accomplished more accurately to enhance the signal-to-noise (S/N) ratio.

Next will be described with reference to FIG. 9 an example of implementation in which magnetic ink detection is accomplished by scanning a bank note with a magnetic ink detecting apparatus of the configuration illustrated in FIG. 5.

The magnetism detecting element 16 used in this magnetic ink detection was an element comprising magnetic detectors 16A and 16B of Fe—Ta—C based highly permeable magnetic films formed in the aforementioned zigzag line pattern over a glass substrate. The length of the zigzag pattern of each of the magnetic detectors 16A and 16B was set to 2 mm, and its width, 0.45 mm. The frequency of the oscillating circuit 40 was set to be 20 MHz, and the gain of the D.C. amplifier 50, 200-fold.

Figure 9A:
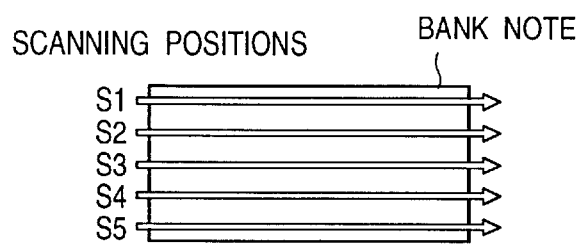
FIG. 9A is a diagram illustrating a state in which a bank note is scanned by a magnetic ink detecting apparatus, which is an embodiment of the invention.
Figure 9B:
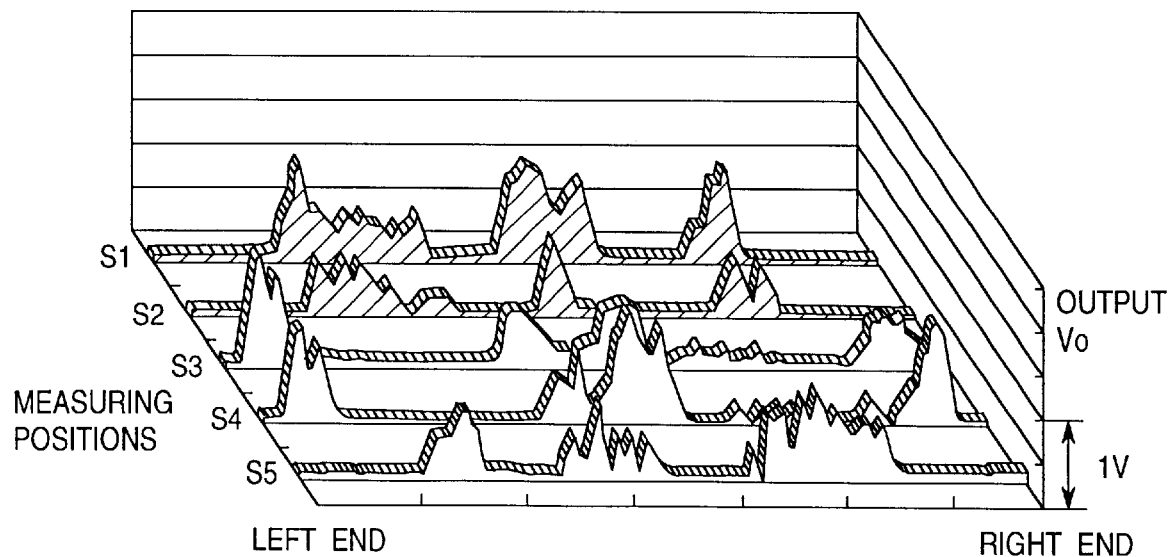
FIG. 9B is a waveform diagram showing the sensor output Vo resulting from the scanning.
Figure 10:
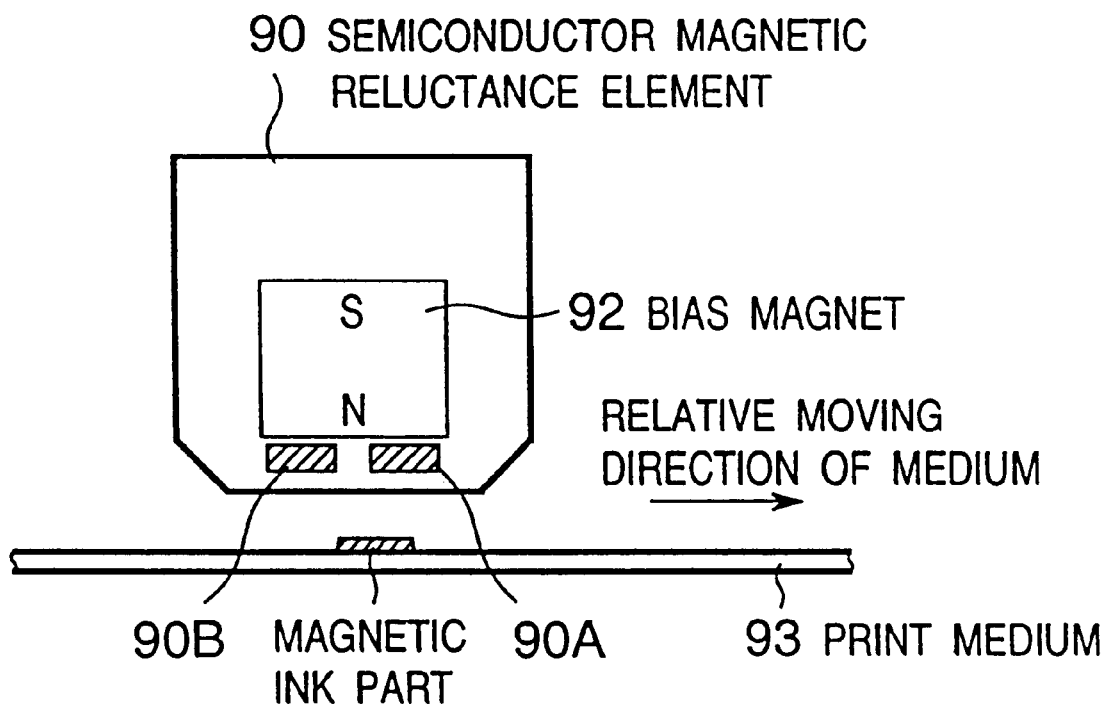
FIG. 10 is a diagram illustrating the configuration of and magnetic ink detection by a semiconductor magnetic reluctance element as a magnetic ink detecting magnetic sensor according to the prior art.
Figure 11A:
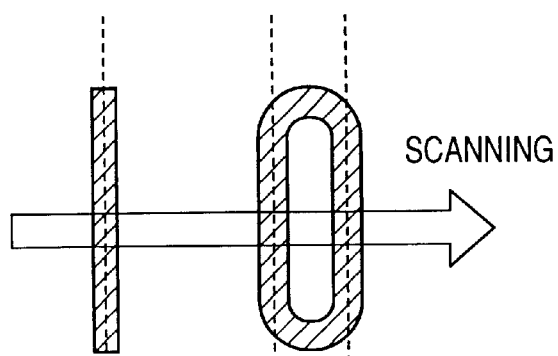
FIG. 11A is a diagram illustrating the state of scanning character patterns by the sensor of FIG. 10.
Figure 11B:
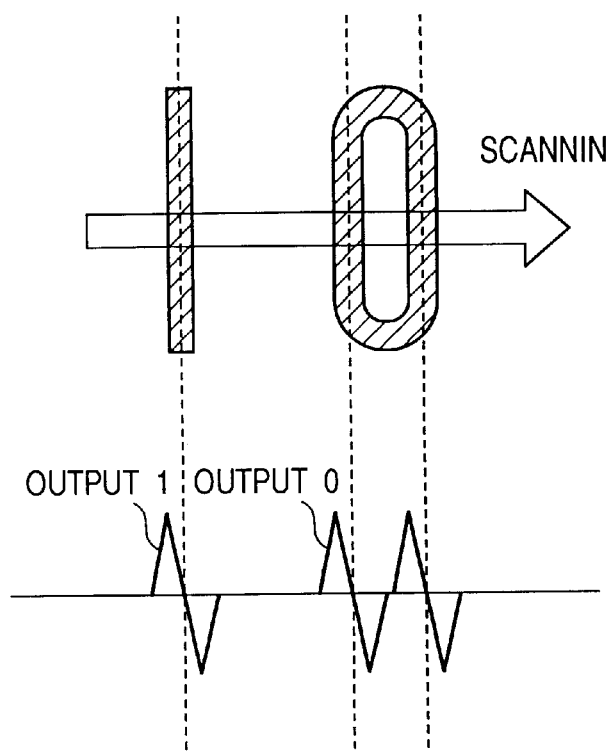
FIG. 11B is a signal waveform diagram representing the sensor output resulting from the scanning.

The bank note was scanned with this magnetic ink detecting apparatus by moving the apparatus relative to the note in the direction of the arrows in the scanning positions of S1 to S5 as shown in FIG. 9A. The resultant sensor output Vo is shown in FIG. 9B. It is seen from this FIG. 9B that signals corresponding to the quantity of magnet ink are reproduced with an appropriate resolution by the rounds of scanning from S1 to S5. It is also seen from the base line of the sensor output Vo corresponding to area where magnetic ink is absent that a satisfactory S/N ratio is attained.

As apparent from the foregoing description that this embodiment of the invention, by the use of a novel magnetizing method using a magnetizing magnet for a magnetic ink detecting magnetic sensor which, in order to detect magnetic ink printed on a print medium, detects magnetic fields driving from magnetic ink by moving relative to the print medium in a prescribed relative moving direction along the surface of the print medium, and by the adoption of a matching configuration and arrangement of a magnetism detecting element, is resistant to disturbing magnetic fields and can accurately detect magnetic fields corresponding to the quantity of magnetic ink printed on the print medium.

The signal processing method for the magnetic sensor to amplify its output signals utilizes the waveform of the unamplified output of the magnetic sensor, which oscillates in only one direction, for D.C. differential amplification of the unamplified output signals of the magnetic sensor and a reference voltage obtained by either peak-holding or minimum-holding the output signals, and can thereby amplify detection signals of the magnetic sensor according to the quantity of magnetic ink stably and accurately free from fluctuations of the base line.

Further, a magnetic ink detecting apparatus for detecting magnetic ink with a magnetic sensor having a magnetic impedance element as the magnetism detecting element according to the above-described embodiment can stably and accurately amplify output signals of the magnetic sensor corresponding to the quantity of magnetic ink free from fluctuations of the base line, and stably and accurately detect the quantity of magnetic ink.

While methods and apparatuses for detecting magnetic ink printed on a printed medium have been described above as embodiments of the present invention, the invention is not limited to these embodiments, but can also be applied for any such method or apparatus for stable and accurate detection of a magnetic body on a non-magnetic body.

What is claimed is:

1. A magnetic sensor for detecting magnetic fields deriving from a magnetic body to detect any magnetic body on a non-magnetic body by moving relative to said non-magnetic body in prescribed relative moving directions along the surface of the non-magnetic body, comprising:

a magnetizing magnet in which a line connecting the N and S poles thereof is a direction substantially orthogonal to, and of which one pole is a magnetizing side pole arranged either in contact with or in proximity to, the surface of said non-magnetic body; and a magnetism detecting element comprising two magnetic detectors arranged along a magnetic field detecting direction, said magnetic field detecting direction being orthogonal to said relative moving directions in a surface parallel to said surface of the non-magnetic body, wherein said magnetizing magnet and said magnetism detecting element are disposed along a line parallel to the relative moving directions, and wherein said magnetic body is magnetized by said magnetizing magnet along with the movement relative to said non-magnetic body, and magnetic fields according to the quantity of the magnetized part of the magnetic body are differentially detected by the two magnetic detectors of said magnetism detecting element.

2. The magnetic sensor according to claim 1, wherein an angle between a direction which is identical with a line connecting the N and S poles of said magnetizing magnet and said relative moving directions is larger than a threshold angle, the threshold angle being an angle such that the center of the magnetizing side pole and the center of the opposite side pole of said magnetizing side pole are equally distant from a straight line which passes through the center of said magnetism detecting element and is parallel to said magnetic field detecting direction, and is 90 degrees or less.

3. The magnetic sensor according to claim 1, wherein an angle between a direction which is identical with a line connecting the N and S poles of said magnetizing magnet and said relative moving directions is an angle in which the center of the magnetizing side pole and the center of the opposite side pole of said magnetizing side pole are equally distant from a straight line which passes through the center of said magnetism detecting element and is parallel to said magnetic field detecting direction.

4. The magnetic sensor according to claim 1, wherein a direction identical with a line connecting the N and S poles of said magnetizing magnet meets said relative moving directions at almost 90 degrees, and a distance between the N and S poles is ¾ or less of a distance from the center of the magnetizing side pole to a straight line that passes through the center of said magnetism detecting element and is parallel to the magnetic field detecting direction.

5. The magnetic sensor according to claim 1, having a magnetizing body combining said magnetizing magnet formed in a bar shape and a U-shaped soft magnetic member to form an overall shape like letter E with said magnetizing magnet within the magnetizing body, the magnetizing body being so arranged that the three open ends of said E shape come either into contact with or close to the surface of said non-magnetic body and be in a direction orthogonal to said relative moving directions.

6. The magnetic sensor according to claim 1, wherein at each side of said magnetizing magnet, a magnetizing magnet in which the NS direction thereof is reverse to that of said magnetizing magnet is disposed.

7. The magnetic sensor according to claim 6, wherein the magnetizing side poles of said two magnetizing magnets disposed at the both sides of the central magnetizing magnets are on the same line orthogonal to said relative moving directions in a surface parallel to the surface of said print medium, and are disposed at the positions being equally distant from said central magnetizing magnet.

8. The magnetic sensor according to claim 7 wherein the magnetizing side poles of said central magnetizing magnet and of said two magnetizing magnets disposed at the both sides of said central magnetizing magnet are all disposed on the same straight line.

9. The magnetic sensor according to claim 7, wherein the straight lines connecting the N and S poles of said central magnetizing magnet and of said magnetizing magnets disposed at the both sides of said central magnetizing magnet, respectively, are all parallel to each other.

10. The magnetic sensor according to claim 7, wherein a distance between the centers of the magnetizing side poles of said two magnetizing magnets disposed at the both sides of said central magnetizing magnet is equal to or more than a length of the magnetic field detecting direction of said magnetism detecting element.

11. The magnetic sensor according to claim 7, wherein a distance a from the center of the magnetizing side pole of the magnetizing magnet disposed at each side of said central magnetizing magnet to the straight line parallel to said magnetic field detecting direction of said magnetism detecting element, and a distance b between the centers of magnetizing side poles of said two magnetizing magnets disposed at the both sides of said central magnetizing magnet satisfy $(\sqrt{2})a > b$.

12. The magnetic sensor according to claim 6, wherein an angle between a direction, which is identical with the lines connecting the N and S poles of said central magnetizing magnet and of said magnetizing magnets disposed at the both sides of said central magnetizing magnet respectively, and said relative moving directions is larger than an angle, in which the centers of the magnetizing side poles and the centers of the opposite side poles of said magnetizing side poles are equally distant from a straight line which passes through the center of said magnetism detecting element and is parallel to said magnetic field detecting direction, and is 90 degrees or less.

13. The magnetic sensor according to claim 6, wherein an angle between a direction, which is identical with the lines connecting the N and S poles of said central magnetizing magnet and of said magnetizing magnets disposed at the both sides of said central magnetizing magnet respectively, and said relative moving directions is an angle in which the centers of the magnetizing side poles and the centers of the opposite side poles of said magnetizing side poles are equally distant from a straight line which passes through the center of said magnetism detecting element and is parallel to said magnetic field detecting direction.

14. The magnetic sensor according to claim 6, wherein the directions identical with the lines connecting the N and S poles of said three magnetizing magnets respectively, including said central magnetizing magnet and other two magnetizing magnets disposed at the both sides of said central magnetizing magnet, meet said relative moving directions at almost 90 degrees, and the distances between the N and S poles of said three magnetizing magnets respectively are ¾ or less of the distances from the centers of the magnetizing side poles of said three magnetizing magnets respectively through the center of said magnetism detecting element to a straight line parallel to the magnetic field detecting direction.

15. The magnetic sensor according to claim 6, wherein said three magnetizing magnets, including said central magnetizing magnet and other two magnetizing magnets disposed at the both sides of said central magnetizing magnet, are in the same shape.

16. The magnetic sensor according to claim 1, wherein said magnetizing magnet and said magnetism detecting element are disposed so that a direction of a straight line connecting the center of said magnetizing magnet or, when said magnetizing magnet comprises a plurality of magnetizing side poles, the central magnetizing side pole, and a middle point between the two magnetic detectors of said magnetism detecting element is identical with said relative moving directions.

17. The magnetic sensor according to claim 16, wherein said magnetizing magnet comprises one or more magnetizing magnet components, and each magnetizing magnet component is held in a common holder in an integral manner.

18. The magnetic sensor according to claim 1, wherein a magnetic shielding member is disposed between said magnetizing magnet and magnetism detecting element.

19. The magnetic sensor according to claim 1, wherein said magnetism detecting element is surrounded by a magnetic shielding member.

20. The magnetic sensor according to claim 1, wherein said magnetic detectors each comprise a magnetic impedance element whose impedance, when a high frequency current is applied thereto, varies with external magnetic fields.

21. The magnetic sensor according to claim 20, wherein the magnetic impedance elements comprising the two magnetic detectors of said magnetism detecting element are formed of highly permeable magnetic films in a zigzag line pattern.

22. The magnetic sensor according to claim 21, wherein the line widths, numbers of folds, lengths and resistances of said two magnetic detectors are substantially equal to each other.

23. The magnetic sensor according to claim 1, wherein said non-magnetic body is a print medium and said magnetic body is magnetic ink.

24. A detecting apparatus comprising:
  the magnetic sensor, according to claim 20, wherein the two magnetic detectors of the magnetism detecting element are connected in series;
  an oscillating circuit for applying a high frequency current to the serial connection of said two magnetic detectors, one of the magnetic detectors being an oscillating circuit side magnetic detector, to which the high frequency current is applied, and the other of the magnetic detectors being a ground side magnetic detector;

a detecting circuit for extracting voltage amplitude variation relative to external magnetic fields from the two ends of the ground side magnetic detector, said detecting circuit outputting an output signal that oscillates in only one of a positive and a negative direction relative to a base line;

a voltage holding circuit for obtaining a reference voltage by performing one of (i) peak holding, when the output signal of the detecting circuit oscillates in the negative direction and (ii) minimum holding, when the output signal of the detecting circuit oscillates in the positive direction, and a D.C. amplifier for differentially D.C.-amplifying the output signal of said detecting circuit and said reference voltage.

25. The detecting apparatus according to claim 24, wherein the two magnetic detectors of said magnetism detecting element are formed of highly permeable magnetic films in a zigzag line pattern.

26. The detecting apparatus according to claim 25, wherein the line widths, numbers of folds, lengths and resistances of said two magnetic detectors are substantially equal to each other.

27. A detecting apparatus comprising:

the magnetic sensor according to claim 20;

an oscillating circuit for generating a high frequency current;

two lines of circuits for separately applying the high frequency current generated by the oscillating circuit to the two magnetic detectors of the magnetism detecting element of said magnetic sensor;

two detecting circuits for extracting voltage amplitude variations relative to external magnetic fields from the two ends of each of the two magnetic detectors;

a differential amplifier for differentially amplifying the outputs of the two detecting circuits at low gains, said differential amplifier outputting an output signal that oscillates in only one of a positive and a negative direction with respect to a base line;

a voltage holding circuit for obtaining a reference voltage by performing one of (i) peak holding, when the output signal of the differential amplifier oscillates in the negative direction and (ii) minimum holding, when the output signal of the differential amplifier oscillates in the positive direction, and a D.C. amplifier for differentially D.C.-amplifying the output signal of said differential amplifier and said reference voltage.

28. The detecting apparatus according to claim 27, wherein the two magnetic detectors of said magnetism detecting element are formed of highly permeable magnetic films in a zigzag line pattern.

29. The detecting apparatus according to claim 28, wherein the line widths, numbers of folds, lengths and resistances of said two magnetic detectors are substantially equal to each other.

30. A signal processing method for amplifying an output signal corresponding to magnetic fields detected by a magnetic sensor having the structure recited in claim 1, wherein the output signal oscillates in only one of a positive and a negative direction relative to a base line, said method comprising the steps of:

obtaining a reference voltage by performing one of (i) peak holding, when the output signal of said magnetic sensor oscillates in the negative direction and (ii) minimum holding, when the output signal of said magnetic sensor oscillates in the positive direction, and performing D.C. differential amplification between the unamplified output signal of said magnetic sensor and said reference voltage.

31. The signal processing method according to claim 30, wherein said non-magnetic body is a print medium and said magnetic body is magnetic ink.

* * * * *

UNITED STATES PATENT AND TRADEMARK OFFICE
CERTIFICATE OF CORRECTION

PATENT NO. : 6,310,475 B1
DATED : October 30, 2001
INVENTOR(S) : Masahiro Kawase et al.

It is certified that error appears in the above-identified patent and that said Letters Patent is hereby corrected as shown below:

Column 3,
Line 53, "above mentioned" should read -- above-mentioned --.

Column 6,
Line 53, "i.e." should read -- i.e., --.

Column 7,
Line 38, "parallel-to" should read -- parallel to --.

Column 8,
Line 12, "i.e." should read -- i.e., --.

Column 10,
Line 23, "above mentioned" should read -- above-mentioned --.
Line 53, "above mentioned" should read -- above-mentioned --.

Column 12,
Line 22, "can not" should read -- cannot --.
Line 31, "above" should read -- above- --.
Line 33, "above" should read -- above- --.

Column 13,
Line 7, "outputs" should read -- output --.
Line 8, "above mentioned" should read -- above-mentioned --.
Line 9, "can not" should read -- cannot --.

Column 15,
Line 19, "Vref ." should read -- Vref. --.

UNITED STATES PATENT AND TRADEMARK OFFICE
CERTIFICATE OF CORRECTION

PATENT NO. : 6,310,475 B1
DATED : October 30, 2001
INVENTOR(S) : Masahiro Kawase et al.

It is certified that error appears in the above-identified patent and that said Letters Patent is hereby corrected as shown below:

Column 17,
Line 25, "claim 7" should read -- claim 7, --.

Signed and Sealed this

Twenty-first Day of May, 2002

Attest:

JAMES E. ROGAN
Director of the United States Patent and Trademark Office

Attesting Officer

UNITED STATES PATENT AND TRADEMARK OFFICE
CERTIFICATE OF CORRECTION

PATENT NO. : 6,310,475 B1
DATED : October 30, 2001
INVENTOR(S) : Masahiro Kawase et al.

It is certified that error appears in the above-identified patent and that said Letters Patent is hereby corrected as shown below:

<u>Title page,</u>
Item [56], References Cited, FOREIGN PATENT DOCUMENTS,
"6-230073 * 10/1986 (JP)" should read -- 61-230073 * 10/1986 (JP) --.

Signed and Sealed this

Twenty-second Day of October, 2002

Attest:

Attesting Officer

JAMES E. ROGAN
*Director of the United States Patent and Trademark Office*